May 19, 1953 J. W. NELSON ET AL 2,638,956
TIRE VALVE STEM PROTECTOR
Filed Feb. 3, 1950

Inventor
John W. Nelson, and
Joel B. Nelson

By Fishburn & Mullendore
Attorneys

Patented May 19, 1953

2,638,956

UNITED STATES PATENT OFFICE 2,638,956

TIRE VALVE STEM PROTECTOR

John W. Nelson and Joel B. Nelson, Independence, Kans., assignors of one-third to Jack W. Ashcraft Application February 3, 1950, Serial No. 142,114

1 Claim. (Cl. 152—428)

This invention relates to protectors for the valve stems of pneumatic tires and the like used on vehicles such as tractors, and more particularly to a device adapted to be secured to a tire rim to prevent foreign objects from striking the conventional tire valve stem.

It is customary to use large pneumatic traction tires on the rear wheels of vehicles such as tractors and to partially fill the inner tubes of said tires with water or a solution of water and antifreeze composition, thereby reducing the volume of air required for proper inflation pressure. In conventional structures the valve stem merely extends through an aperture in the rim of the wheel and in operation of the vehicle, branches, weeds, sticks and the like frequently are struck and pushed to one side by the forward portion of the wheels. As said forward portion of the wheel passes the branch or the like it snaps back, striking the spokes or other portions of the wheels. Many times the tire valve stem is so positioned that said sticks, branches or the like snap back and strike the portion of the tire valve stem extending from the aperture in the rim and break the ends off of the stem or damage the valve, and in some instances pull the stem from the tube. When this happens, the water and/or solution in the tire run out of the tube and the tire becomes flat. Due to the size of the tire and the fact that such damages usually happen out in the field away from places where repairs can be obtained, it is usually necessary to remove the wheel from the tractor, load it on a truck and take it in to a nearby city where the tire can be removed and a new stem placed in the tube. Also this repair is quite expensive and causes loss of use of the tractor for a long period during the time that it is almost essential that it remain in operation to perform farming operations as adverse weather may limit the time available for same.

The objects of the present invention are to provide a pneumatic tire valve stem protector adapted to be rigidly secured to the rim of the wheel to prevent foreign bodies from contacting the tire stem; to provide a cap for entirely enclosing the tire valve stem of a vehicle with means for rigidly mounting said cap on the wheel rim; to provide a cap mounting which may be applied to the wheel rim in surrounding relation to the tire stem without removing the tire from the rim; to provide a tire protector including a cap whereby removal of the cap exposes the operative portions of the tire stem for filling the tube with liquid and/or air as in conventional servicing of said tire; and to provide a simple, efficient, rigid tire protector and mounting on a tire rim, said protector being economical to manufacture, easy to apply to the conventional wheel rim, and capable of providing positive protection of the valve stem from foreign objects and the like to obviate any possibility of damage to said stem or valve structure, said stem being freely movable in the protector and mounting so as not to interfere with conventional servicing and use of the tire and tube.

In accomplishing these and other objects of the present invention, we have provided improved details of structure, the preferred forms of which are illustrated in the accompanying drawings, wherein.

Figure 1:
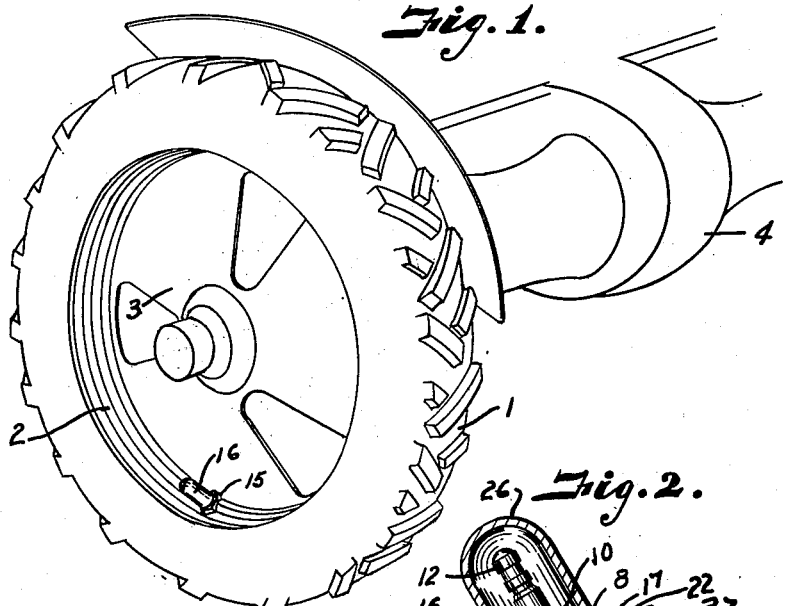
Fig. 1 is a perspective view of a pneumatic tire on a wheel of a vehicle such as a tractor with the tire valve stem protector mounted on the wheel rim.

Referring more in detail to the drawings:

1 designates a pneumatic tire mounted on a wheel rim 2 of a wheel 3 of a vehicle 4, such as a tractor or the like. Located inside of the tire is an inner tube 5 having a conventional valve stem 6 extending through an aperture 7 in the wheel rim 2. In the structure illustrated the tire, tube and rim are of conventional structure, the aperture 7 being located in the wheel rim in such a manner that the conventional stem 6 may extend therethrough.

The stem 6 in tractor tires and the like has a rubber body 8, suitably molded or vulcanized to the tube 5, the body 8 having a central passage 9 therein providing communication with the interior of the tube. The end of the body 8 is provided with a metal member 10 having internal threads for mounting a valve assembly 11, a cap 12 being shown as applied to the valve assembly to close the opening therein. The member 10 is provided with external threads adapted to receive a fitting used in conventional practice for partially filling the tire with liquid such as water and/or antifreeze solution. This operation is performed with the valve assembly 11 removed from the stem. After partially filling the tube 5 with liquid, the valve assembly is screwed into the member 10 and air applied to complete the inflation of the tire. After inflation, the cap 12 is normally applied to the valve assembly to serve as a dust cap therefor. Frequently the size of the aperture 7 is such that it closely engages the sides of the body 8, and in operation of such conventional structure, sticks, branches and the like moved by the tire or wheel in progress of the vehicle will snap against the valve stem 6, damaging the valve assembly and in some instances pulling the valve stem from the tube.

A protector assembly 13 consisting of a ferrule or bushing 14 suitably secured to the rim as by a fastening device or nut 15, and cap 16 are applied in such a manner as to be rigid with the rim 2 and enclose the valve stem 6 to protect same from contact with foreign obects. The ferrule 14 as illustrated has an externally threaded shank 17 provided with a coaxial bore 18 which is a sliding fit on the valve body member 8. In instances where the aperture 7 in the standard rim closely engages the body member 8, said aperture may be reamed or otherwise formed whereby the threaded shank 17 is a loose fit therein. The ferrule 14 is provided on one end with an annular flange 19 adapted to engage the inner surface 20 of the rim 2 whereby said flange is located between the rim and the tube 5, with the threaded shank 17 extending outwardly through the aperture 7.

The fastening device or nut 15 preferably consists of an externally threaded shank 21 having an axial internally threaded bore 22 and is provided with an annular flange 23 at one end thereof. The flange 23 is preferably flattened as at 24 adapting same to be engaged by a wrench or other member for facilitating the turning of the fastening device. The fastening device 15 is arranged with the flange 23 adjacent the rim 2 and the threaded bore threaded onto the threaded shank 17 of the ferrule 14 whereby the flange 23 engages the external surface 25 of the rim 2 surrounding the aperture 7 and threading of the fastening device 15 onto the shank 17 draws the flange 19 into engagement with the rim to rigidly secure the ferrule and fastening device to said rim and provide an assembly through which the stem 6 may project in the same manner as it would extend through the aperture 7 in a conventional rim.

The cap 16 is preferably a tubular shell having a closed end 26 and an open end 27, there being internal threads 28 adjacent the open end 27 of such size that the cap may be threaded onto the externally threaded shank 21 of the fastening device 15. The cap is of such length that the closed end 26 is spaced from the cap 12 of the valve stem 6 and the walls of the cap are also spaced from the valve stem as illustrated in Fig. 2, whereby the valve stem is completely enclosed but the only contact between the valve stem and the protector assembly is with the bore 18 of the ferrule 14.

Figure 2:
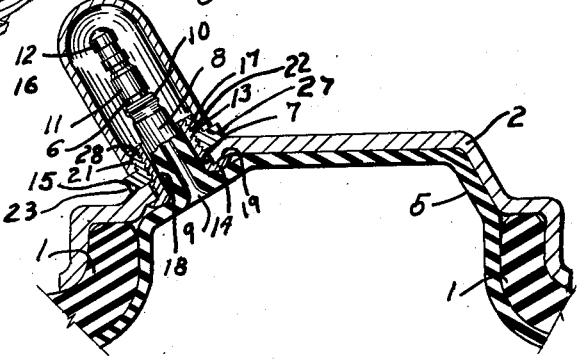
Fig. 2 is a transverse sectional view through the wheel rim and tire protector thereon.
Figure 3:
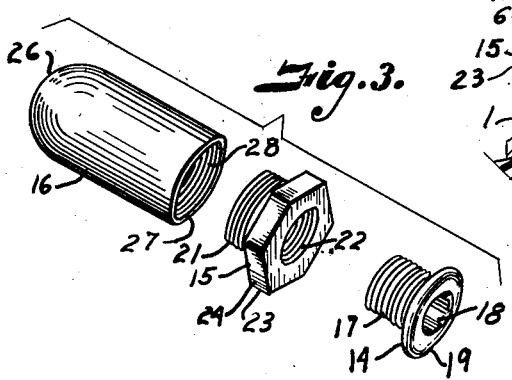
Fig. 3 is a disassembled perspective view of the parts of the tire protector.
Figure 4:
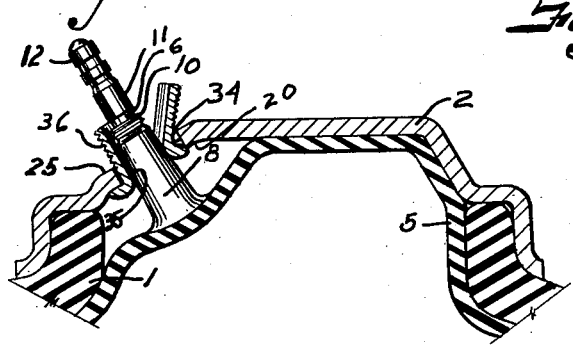
Fig. 4 is a transverse sectional view through a wheel rim illustrating the mounting of a split ferrule in the rim with the tire and tube in place.
Figure 5:
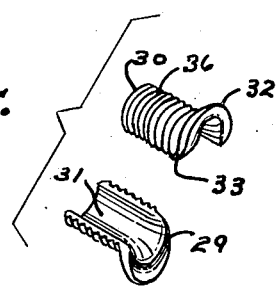
Fig. 5 is a disassembled perspective view of the split ferrule or bushing.

The ferrule as illustrated in Figs. 2 and 3 is particularly adapted for use when the wheel is in a place of repair and the tire and tube removed from the rim providing access to the interior surface 20 of said rim. In instances where the protector is to be assembled to the rim with the tire and tube thereon as, for example, in a field and without removing the liquid from the tube, a split ferrule 29 is used in place of the ferrule 14. The ferrule 29 is substantially the same size and structure as the ferrule 14 except that it is split longitudinally on a diameter to provide halves 30 and 31, each having flanges 32 at one end which are flattened on each side, as at 33, whereby said flanged end may be inserted through an aperture 34 in the rim 2 and the flange 32 engaged with the interior surface 20 of said rim. When applied to the rim as illustrated in Fig. 4, the split ferrule 29 has a bore 35 through which the stem 6 extends, engagement of the stem with the bore holding the ferrule halves 30 and 31 in engagement with the bore 34. The flanges 32 engage the rim and the threaded shank portions 36 of the split ferrule extend from the rim for mounting of the fastening device 15. The cap 16 is mounted on the fastening device 15 in the same manner as when used with the ferrule 14. In either structure it is unnecessary to remove the ferrule or fastening device 15 for any servicing of the tire and tube.

In using a device constructed as described and assembled on a wheel rim, the tire and tube are mounted on the rim as in conventional practice with the stem 6 extending through the bore 18 of the ferrule 14. The tube is inflated as in conventional practice and the cap 16 applied by threading same onto the threaded shank 21 of the fastening device 15. In operation of the vehicle, such as a tractor, movement of the vehicle may cause the wheels to push branches, sticks or the like out of the way and then as the branches or sticks snap back to their original position, they may strike the cap 16. Even though such blows are very hard, the entire impact will be taken by the cap 16 and any bending action resulting from the blow will be taken up by the rigid connection of the cap with the fastening device and the rigid mounting of the ferrule and fastening device on the wheel rim whereby all of the stress is applied to the protector and the rim and not to the stem 6. The rigid mounting of the protector makes it impossible for any obstruction to even bend the stem, let alone damage same.

When it is desired to check the pressure and inflate or deflate the tube 5, the cap 16 is removed from the threaded shank 21 exposing all of the operative portions of the valve stem and valve assembly, whereby the conventional servicing operations may be performed. Also the tire and tube may be removed without removing the ferrules 14 or fastening device 15. When any servicing is completed and the stem 6 extending through the bore 18, the cap 16 may be reapplied to the fastening device by threading said cap onto the shank 21.

It is believed obvious that we have provided a tire valve stem protector which is economical to manufacture and efficient in use to protect the valve stem from damage by foreign objects and yet not interfere with conventional servicing operations on the tire and tube.

What we claim and desire to secure by Letters Patent is:

A valve stem protector for enclosing a portion of a valve stem projecting through an aperture in a rim mounting a pneumatic tire and inner tube for a vehicle wheel for shielding said valve stem from physical damage due to impact by foreign objects comprising, a ferrule having a threaded shank adapted to extend through the aperture in the rim, said ferrule having an axial bore for sleeving the ferrule on the valve stem, said ferrule being split substantially on a diameter to form two pieces whereby said ferrule may be inserted in the aperture of the rim with the tire mounted thereon, flanges on each of the ferrule pieces adapted to engage the inner surface of the rim surrounding the aperture, a fastening device threadedly mounted on the threaded ferrule shank for rigidly securing the ferrule to the rim, a hollow cap having one end open for enclosing the projecting portion of the valve stem, and means for removably securing the hollow cap relative to the ferrule with the walls of the cap spaced from the valve stem to form a rigid housing for said valve stem whereby the force from any impact on the cap is all transmitted to the ferrule and rim and not to the valve stem which is movable through the ferrule independently of the protector.

JOHN W. NELSON.
JOEL B. NELSON.

References Cited in the file of this patent

UNITED STATES PATENTS

| Number | Name | Date |
|---|---|---|
| 492,580 | Hadley | Feb. 28, 1893 |
| 1,062,000 | Hahn | May 20, 1913 |
| 1,200,358 | Iorns | Oct. 3, 1916 |
| 1,218,111 | Nielsen | Mar. 6, 1917 |
| 1,376,296 | Snow | Apr. 26, 1921 |
| 1,512,662 | Atkinson et al. | Oct. 21, 1924 |
| 1,542,704 | Kirkpatrick | June 16, 1925 |